(12) United States Patent
Ki et al.

(10) Patent No.: US 9,598,612 B2
(45) Date of Patent: Mar. 21, 2017

(54) ADHESIVE COMPOSITION AND OPTICAL MEMBER USING THE SAME

(75) Inventors: Hee Yeon Ki, Uiwang-si (KR); Woo Jin Jeong, Uiwang-si (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 822 days.

(21) Appl. No.: 13/279,734

(22) Filed: Oct. 24, 2011

(65) Prior Publication Data
US 2012/0171482 A1 Jul. 5, 2012

(30) Foreign Application Priority Data

Dec. 30, 2010 (KR) .................. 10-2010-0138877
Dec. 30, 2010 (KR) .................. 10-2010-0139715

(51) Int. Cl.
| | | |
|---|---|---|
| *C09J 7/02* | (2006.01) | |
| *C09J 11/06* | (2006.01) | |
| *G02B 1/00* | (2006.01) | |
| *C09J 133/04* | (2006.01) | |
| *C08K 5/00* | (2006.01) | |
| *C08K 5/29* | (2006.01) | |

(52) U.S. Cl.
CPC .......... *C09J 7/0246* (2013.01); *C08K 5/0025* (2013.01); *C08K 5/29* (2013.01); *C08K 2201/014* (2013.01); *C09J 2203/318* (2013.01); *C09J 2205/102* (2013.01); *C09J 2433/00* (2013.01); *Y10T 428/2848* (2015.01); *Y10T 428/2891* (2015.01)

(58) Field of Classification Search
None
See application file for complete search history.

(56) References Cited

U.S. PATENT DOCUMENTS

| | | | |
|---|---|---|---|
| 5,795,650 A | 8/1998 | Watanabe et al. | |
| 7,630,031 B2 * | 12/2009 | Ito .................................. | 349/96 |
| 8,288,450 B2 | 10/2012 | Song et al. | |
| 2006/0036040 A1 | 2/2006 | Takeko et al. | |
| 2006/0162857 A1 * | 7/2006 | Nagamoto et al. ........ | 156/272.8 |
| 2007/0207312 A1 | 9/2007 | Ikeya et al. | |
| 2007/0299157 A1 | 12/2007 | Sang et al. | |
| 2008/0033096 A1 * | 2/2008 | Takahashi et al. ........... | 524/460 |
| 2010/0028671 A1 * | 2/2010 | Mitsui et al. .................. | 428/354 |
| 2010/0328584 A1 * | 12/2010 | Toyama ................. | C09J 133/08 349/96 |
| 2011/0236605 A1 * | 9/2011 | Hattori et al. ............... | 428/1.55 |
| 2012/0004369 A1 | 1/2012 | Ogawa et al. | |
| 2012/0108733 A1 | 5/2012 | Suwa et al. | |
| 2012/0315476 A1 | 12/2012 | Ogawa et al. | |

FOREIGN PATENT DOCUMENTS

| | | |
|---|---|---|
| CN | 102311710 A | 1/2012 |
| CN | 103087659 A | 5/2013 |
| EP | 1829947 A2 | 9/2007 |
| JP | 09-087593 A | 3/1997 |
| JP | 11-293222 A | 10/1999 |
| JP | 11293222 A * | 10/1999 |
| JP | 2001272541 A * | 10/2001 |
| JP | 2006-169496 A | 6/2006 |
| KR | 10-2003-0069461 A | 8/2003 |
| KR | 10 2010-0009544 A | 1/2010 |
| TW | 200609323 A | 3/2006 |
| TW | 200804553 A | 1/2008 |
| TW | 201035264 A | 10/2010 |
| WO | WO 03/070849 A1 | 8/2003 |

OTHER PUBLICATIONS

Machine translation of JP 11-293222 (1999).*
Machine translation of JP 2001-272541 (2001).*
Chinese Office Action in CN 201110331963.6, dated Jun. 27, 2013, with English translation (Ki, et al.).
Chinese Office Action dated Apr. 17, 2014.

* cited by examiner

*Primary Examiner* — Alexandre Ferre
(74) *Attorney, Agent, or Firm* — Lee & Morse, P.C.

(57) ABSTRACT

An adhesive composition and an optical member using the same, the adhesive composition including an acrylic resin; an isocyanate cross-linking agent; and a carbodiimide cross-linking agent, wherein the adhesive composition exhibits a creeping distance of about 100 μm or less when the composition attached to a glass substrate with a bonding area of about 1.5 cm×1.5 cm is left at about 22° C. and about 50% RH for about 3 days and is subjected to a load of about 10 gf/mm² for about 1,000 seconds, and a storage modulus of about $1\times10^5$ to about $1\times10^7$ Pa at about 10 Hz and about 30° C. under conditions in which a sample has a thickness of about 1 mm and an elongation of about 10%.

12 Claims, No Drawings

ADHESIVE COMPOSITION AND OPTICAL MEMBER USING THE SAME

BACKGROUND

1. Field

Embodiments relates to an adhesive composition and an optical member using the same.

2. Description of the Related Art

Optical films may include, e.g., a polarizer plate, a color filter, a phase retardation film, an oval polarizer film, a reflection film, an antireflection film, a compensation film, a brightness enhancement film, an alignment film, a light diffusing film, a glass anti-scattering film, a surface protective film, a plastic LCD substrate, and the like, which are used for various optical members including an LCD.

For example, a polarizer plate may include iodine compounds or dichroic materials oriented in one direction and may constitute a multilayer using triacetyl cellulose (TAC) protective films on opposite sides in order to protect a polarizing device. Further, the polarizer plate may include a phase retardation film (having a unidirectional molecular alignment), or a compensation film (for wide view angle such as a liquid crystal type film). These films may be formed of materials having different molecular structures and compositions to exhibit different physical properties. For example, under high-temperature and high-humidity conditions, the films may have insufficient dimensional stability due to contraction or expansion of materials having a unidirectional molecular arrangement.

SUMMARY

Embodiments are directed to an adhesive composition and an optical member using the same.

The embodiments may be realized by providing an adhesive composition including an acrylic resin; an isocyanate cross-linking agent; and a carbodiimide cross-linking agent, wherein the adhesive composition has a creeping distance of about 100 μm or less when the composition attached to a glass substrate with a bonding area of about 1.5 cm×1.5 cm is left at about 22° C. and about 50% RH for about 3 days and is subjected to a load of about 10 gf/mm² for about 1,000 seconds, and the adhesive composition has a storage modulus of about $1 \times 10^5$ to about $1 \times 10^7$ Pa at about 10 Hz and about 30° C. under conditions in which a sample has a thickness of about 1 mm and an elongation of about 10%.

The acrylic resin may include a (meth)acrylate copolymer, the (meth)acrylate copolymer including about 0.01 to about 5 wt % of repeating units of a hydroxyl group containing monomer.

The acrylic resin may include a first (meth)acrylate copolymer including less than about 0.01 wt % of repeating units of a hydroxyl group containing monomer, and a second (meth)acrylate copolymer including about 0.01 to about 5 wt % of repeating units of a hydroxyl group containing monomer.

The acrylic resin may include about 85 to about 99 wt % of the first (meth)acrylate copolymer, and about 1 to about 15 wt % of the second (meth)acrylate copolymer.

The first (meth)acrylate copolymer may have a weight average molecular weight of about 1,000,000 to about 2,000,000 g/mol, and the second (meth)acrylate copolymer may have a weight average molecular weight of about 500,000 to about 1,500,000 g/mol.

The first (meth)acrylate copolymer may be polymerized from a monomer mixture including about 85 to about 99.99 wt % of C1 to C20 alkyl(meth)acrylate, less than about 0.01 wt % of a hydroxyl group containing monomer, and about 0.01 to about 15 wt % of a carboxyl group containing monomer, and the second (meth)acrylate copolymer may be polymerized from a monomer mixture including about 90 to about 99 wt % of C1 to C20 alkyl(meth)acrylate, about 0.01 to about 5 wt % of a hydroxyl group containing monomer, and about 0.1 to about 5 wt % of a carboxyl group containing monomer.

The acrylic resin may have a weight average molecular weight of about 1,500,000 to about 3,000,000 g/mol.

The adhesive composition may include 100 parts by weight of the acrylic resin; about 1 to about 30 parts by weight of the isocyanate cross-linking agent; and about 0.001 to about 1 part by weight of the carbodiimide cross-linking agent.

The adhesive composition may further include about 0.01 to 20 parts by weight of a silane coupling agent.

The adhesive composition may include 100 parts by weight of the acrylic resin; greater than about 10 parts by weight to less than about 30 parts by weight of the isocyanate cross-linking agent; and about 0.005 to about 0.1 parts by weight of the carbodiimide cross-linking agent.

A weight ratio of the isocyanate cross-linking agent to the carbodiimide cross-linking agent may be about 500:1 to about 3,000:1.

The embodiments may also be realized by providing an optical member including an optical film; and an adhesive layer prepared from the adhesive composition according to an embodiment, the adhesive layer being on one or more sides of the optical film.

The optical member may have a 180° peel strength of about 250 to 600 gf/25 mm between an adhesive (polarizer film) and a glass substrate at a tensile rate of about 300 mm/min by JIS 2107 when the optical member is left at about 35° C. and about 45% RH for about 1 day and then stabilized at about 25° C. for about 12 hours.

The embodiments may also be realized by providing an adhesive composition including 100 parts by weight of an acrylic resin, the acrylic resin including a (meth)acrylate copolymer including about 0.01 to about 5 wt % of repeating units of a hydroxyl group containing monomer; about 1 to about 30 parts by weight of an isocyanate cross-linking agent; and about 0.001 to about 1 part by weight of a carbodiimide cross-linking agent.

DETAILED DESCRIPTION

Korean Patent Application Nos. 10-2010-0138877 and 10-2010-0139715, filed on Dec. 30, 2010, in the Korean Intellectual Property Office, and entitled: "Adhesive Composition and Optical Member Using the Same," are incorporated by reference herein in their entireties.

Example embodiments will now be described more fully hereinafter; however, they may be embodied in different forms and should not be construed as limited to the embodiments set forth herein. Rather, these embodiments are provided so that this disclosure will be thorough and complete, and will fully convey the scope of the invention to those skilled in the art.

It will also be understood that when a layer or element is referred to as being "on" another layer or substrate, it can be directly on the other layer or substrate, or intervening layers may also be present.

An adhesive composition according to an embodiment may include, e.g., an acrylic resin (A), an isocyanate cross-linking agent (B), and a carbodiimide cross-linking agent (C). In an implementation, the adhesive composition may further include a silane coupling agent (D).

(A) Acrylic Resin

The acrylic resin (A) may include, e.g., a (meth)acrylate copolymer polymerized from a monomer including a hydroxyl group containing monomer.

The acrylic resin (A) may include, e.g., a (meth)acrylate copolymer including about 0.01 to about 5 wt % of repeating units of a hydroxyl group containing monomer.

For example, the acrylic resin (A) may include a first (meth)acrylate copolymer (a1) including less than about 0.01 wt % of repeating units of the hydroxyl group containing monomer and a second (meth)acrylate copolymer (a2) including about 0.01 to about 5 wt % of repeating units of the hydroxyl group containing monomer.

In an implementation, the acrylic resin (A) may include about 85 to about 99 wt % of the first (meth)acrylate copolymer (al) (including less than about 0.01 wt % of repeating units of the hydroxyl group containing monomer) and about 1 to about 15 wt % of the second (meth)acrylate copolymer (a2) (including about 0.01 to about 5 wt % of repeating units of the hydroxyl group containing monomer). In another implementation, the acrylic resin (A) may include about 90 to about 95 wt % of the first (meth)acrylate copolymer (al) and about 5 to about 10 wt % of the second (meth)acrylate copolymer (a2). Within this range, excellent peel strength and heat and moisture resistance may be obtained.

The first (meth)acrylate copolymer (a1) may have a weight average molecular weight of about 1,000,000 to about 2,000,000 g/mol, e.g., about 1,300,000 to about 1,800,000. The second (meth)acrylate copolymer (a2) may have a weight average molecular weight of about 500,000 to about 1,500,000 g/mol, e.g., about 800,000 to about 1,200,000 g/mol. Within this range, foaming or separation may be reduced or prevented under conditions for heat and moisture resistant tests and excellent durability may be obtained.

In an implementation, the first (meth)acrylate copolymer (a1) may be polymerized from a monomer mixture including, e.g., about 85 to about 99.99 wt % of a C1 to C20 alkyl(meth)acrylate and about 0.01 to about 15 wt % of a carboxyl group containing monomer. In an implementation, the monomer mixture may include less than about 0.01 wt % of a hydroxyl group containing monomer. Within this range, foaming or separation may be reduced or prevented under conditions for heat and moisture resistant tests, and excellent durability may be obtained. In another implementation, the first (meth)acrylate copolymer (a1) may be polymerized from a monomer mixture including, e.g., about 90 to about 99.9 wt % of the C1 to C20 alkyl(meth)acrylate and about 0.01 to about 10 wt % of the carboxyl group containing monomer. In an implementation, the monomer mixture may include about 0.005 wt % or less of the hydroxyl group containing monomer.

In an implementation, the second (meth)acrylate copolymer (a2) may be polymerized from a monomer mixture including, e.g., about 90 to about 99 wt % of C1 to C20 alkyl(meth)acrylate, about 0.01 to about 5 wt % of a hydroxyl group containing monomer, and about 0.1 to about 5 wt % of a carboxyl group containing monomer. Within this range, foaming or separation may be reduced or prevented under conditions for heat and moisture resistant tests, and desired reworkability and excellent durability may be obtained. In another implementation, the second (meth) acrylate copolymer (a2) may be polymerized from a monomer mixture including, e.g., about 90 to about 99 wt % of the C1 to C20 alkyl(meth)acrylate, about 0.1 to about 5 wt % of the hydroxyl group containing monomer, and about 1 to about 5 wt % of the carboxyl group containing monomer.

Examples of the C1 to C20 alkyl(meth)acrylate may include methyl(meth)acrylate, ethyl(meth)acrylate, propyl (meth)acrylate, butyl(meth)acrylate, pentyl(meth)acrylate, hexyl(meth)acrylate, heptyl(meth)acrylate, octyl(meth)acrylate, nonyl(meth)acrylate, decyl(meth)acrylate, undecyl (meth)acrylate, and lauryl(meth)acrylate, which may be used alone or as mixtures. Herein, the term "(meth)acrylate" may collectively refer to both acrylate and methacrylate.

Examples of the hydroxyl group containing monomer may include 2-hydroxyethyl(meth)acrylate, 4-hydroxybutyl (meth)acrylate, 2-hydroxpropyl(meth)acrylate, 2-hydroxybutyl(meth)acrylate, 6-hydroxyhexyl(meth)acrylate, 1,4-cyclohexanedimethanol mono(meth)acrylate, chloro-2-hydroxypropyl(meth)acrylate, diethylene glycol mono (meth)acrylate, and allyl alcohol.

Examples of the carboxyl group containing monomer may include (meth)acrylic acid, 2-carboxyethyl(meth)acrylate, 3-carboxypropyl(meth)acrylate, 4-carboxybutyl(meth)acrylate, itaconic acid, crotonic acid, maleic acid, fumaric acid, and maleic anhydride.

The acrylic resin (A) may have a weight average molecular weight of about 1,500,000 to about 3,000,000 g/mol. Within this range, foaming or separation may be reduced or prevented under conditions for heat and moisture resistance tests, and desired reworkability and excellent durability may be obtained.

(B) Isocyanate Cross-Linking Agent

The isocyanate cross-linking agent may include, e.g., aromatic diisocyanates, such as diallyl isocyanate, dimeric acid diisocyanate, 2,4-tolylene diisocyanate (2,4-TDI), 2,6-tolylene diisocyanate (2,6-TDI), 4,4'-diphenylmethane diisocyanate (4,4'-MDI), 2,4'-diphenylmethane diisocyanate (2,4'-MDI), 1,4-phenylene diisocyanate, xylylene diisocyanate (XDI), tetramethylxylylene diisocyanate (TMXDI), toluidine diisocyanate (TODI), and 1,5-naphthalene diisocyanate (NDI); aliphatic diisocyanates, such as hexamethylene diisocyanate (HDI), trimethylhexamethylene diisocyanate (TMHDI), lysine diisocyanate, and norbornane diisocyanate (NBDI); alicyclic diisocyanates, such as trans-cyclohexane-1,4-diisocyanate, isophorone diisocyanate (IPDI), H6-XDI (hydrogen added XDI), and H12-MDI (hydrogen added MDI); or isocyanurate-modified diisocyanates thereof, which may be used alone or as mixtures. In an implementation, the isocyanate cross-linking agent may include a compound having an aromatic group.

The isocyanate cross-linking agent may be obtained by synthesis or from commercially available products. Commercially available products of the isocyanate cross-linking agent may include, e.g., Coronate® L, Coronate® HL, Coronate® 2030, Coronate® 2031 (all available from Nippon Polyurethane Industry Co., Ltd.); Takenate® D-102, Takenate® D-110N, Takenate® D-200, Takenate® D-202 (all available from Mitsui Chemicals Inc.); Duranate™ 24A-100, Duranate™ TPA-100, Duranate™ TKA-100, Duranate™ P301-75E, Duranate™ E402-90T, Duranate™ E405-80T, Duranate™ TSE-100, Duranate™ D-101, and Duranate™ D-201 (all available from Asahi Kasei Corporation); or the like.

The isocyanate cross-linking agent (B) may be present in an amount of about 1 to about 30 parts by weight, e.g., greater than about 10 parts by weight to less than about 30 parts by weight or about 12 to about 25 parts by weight, based on 100 parts by weight of the acrylic resin (A). Within this range, excellent tack and peel strength and low light leakage may be obtained.

(C) Carbodiimide Cross-Linking Agent

The carbodiimide cross-linking agent may include any carbodiimide cross-linking agent known in the art, without being particularly limited. For example, a compound having at least two carbodiimide groups (—N=C=N—) may be used, and any polycarbodiimide known in the art may be used.

For example, a diisocyanate compound including at least two carbodiimide groups may be used. Further, the carbodiimide compound may include high molecular weight polycarbodiimide prepared by decarbonation condensation reaction of diisocyanate in the presence of a carbodiimide catalyst. Examples of the compound may include compounds obtained by decarbonation condensation reaction of the following diisocyanates. The diisocyanates include 4,4'-diphenylmethane diisocyanate, 3,3'-dimethoxy-4,4'-diphenylmethane diisocyanate, 3,3'-dimethyl-4,4'-diphenylmethane diisocyanate, 4,4'-diphenylether diisocyanate, 3,3'-dimethyl-4,4'-diphenylether diisocyanate, 2,4-tolylene diisocyanate, 2,6-tolylene diisocyanate, 1-methoxyphenyl-2,4-diisocyanate, isophorone diisocyanate, 4,4'-dicyclohexylmethane diisocyanate, and tetramethyl xylene diisocyanate, which may be used alone or in a combination thereof. The carbodiimide catalyst may include phospholene oxides, such as 1-phenyl-2-phospholene-1-oxide, 3-methyl-2-phospholene-l-oxide, 1-ethyl-3-methyl-2-phospholene-1-oxide, 1-ethyl-2-phospholene-l-oxide, 3-phospholene and isomers thereof.

In addition, these high-molecular weight polycarbodiimides may be obtained by synthesis or from commercially available products. Commercially available products of the component may include CARBODILITE® (Nisshinbo Chemical Inc.), for example, CARBODILITE® V-01, V-03, V-05, V-07, and V09, which have excellent compatibility with organic solvents.

The carbodiimide cross-linking agent (C) may be present in an amount of about 0.001 to about 1 part by weight, e.g., about 0.005 to about 0.1 parts by weight or about 0.007 to about 0.05 parts by weight, based on 100 parts by weight of the acrylic resin (A). Within this range, aging time may be reduced, and low light leakage and proper durability may be obtained.

In an implementation, a weight ratio of the isocyanate cross-linking agent (B) to the carbodiimide cross-linking agent (C) may be about 500:1 to about 3,000:1, e.g., about 500:1 to about 2,000:1. Within this range, excellent creep properties may be obtained.

(D) Silane Coupling Agent

Any suitable silane coupling agent may be used to, e.g., further improve adhesion stability and adhesion reliability.

Examples of the silane coupling agent may include γ-glycidoxypropyltrimethoxysilane, γ-glycidoxypropylmethyldiethoxysilane, γ-glycidoxypropyltriethoxysilane, 3-mercaptopropyltrimethoxysilane, vinyltrimethoxysilane, vinyltriethoxysilane, γ-methacryloxypropyltrimethoxysilane, γ-methacryloxypropyltriethoxysilane, γ-aminopropyltriethoxysilane, 3-isocyanatopropyltriethoxysilane, and γ-acetoacetate propyltrimethoxysilane, which may be used alone or as mixtures thereof.

The silane coupling agent may be present in an amount of about 0.01 to about 20 parts by weight, e.g., about 0.05 to about 5 parts by weight or about 0.07 to about 1 part by weight, based on 100 parts by weight of the acrylic resin (A). Within this range, desired adhesion stability and adhesion reliability may be obtained.

The adhesive composition may further include an additive, as desired. The additive may include, e.g., a UV stabilizer, an antioxidant, a colorant, a reinforcing agent, fillers, an antifoaming agent, a surfactant, a plasticizer, or the like.

The adhesive composition may be prepared by any suitable method. In an implementation, the acrylic resin may be uniformly mixed with the cross-linking agents and the silane coupling agents, thereby preparing the adhesive composition. A solvent may be added for dilution, as desired.

The adhesive composition may have a creeping distance of about 100 μm or less obtained when applying a load of about 10 gf per about 1 $mm^2$ for about 1,000 seconds. The adhesive composition may have a storage modulus of about $1 \times 10^5$ to about $1 \times 10^7$ Pa at about 10 Hz and about 30° C. Within this range, excellent heat resistance and light leakage resistance may be obtained and separation or bubbles may be reduced or prevented at an end portion.

The creeping distance may be obtained by measuring the creeping distance of an adhesive as follows: a polarizer plate is attached to a glass substrate having a bonding area of about 1.5 cm×1.5 cm and left at about 22° C. and about 50% RH for about 3 days, followed by application of a load of about 10 gf per about 1 $mm^2$ for about 1,000 seconds. This storage modulus may be an elastic modulus at about 30° C. obtained by measuring a dynamic storage modulus using a fixture with a parallel plate having a diameter of about 8 mm at a frequency of about 10 Hz from about 0 to 120° C. under a condition that a sample has a thickness of about 1 mm and an elongation of about 10%.

The prepared adhesive composition may deposited on an optical film and aged, thereby forming an adhesive layer.

Another embodiment provides an optical member using the adhesive composition. The optical member may include an adhesive layer prepared from the adhesive composition. The adhesive layer may be formed on one side or opposite, e.g., both, sides of an optical film. The adhesive layer may be formed on the optical film by any suitable method. For example, the adhesive composition may be deposited directly on the optical film and dried, or the adhesive layer may be formed on a release substrate and then transferred to the optical film. The adhesive layer may have a thickness of about 10 to 100 μm, e.g., about 20 to 70 μm.

In an implementation, the optical member may have a 180° peel strength of about 250 to about 600 gf/25 mm between the adhesive (polarizer film) and a glass substrate at a tensile rate of about 300 mm/min by JIS 2107. The peel strength may be obtained as follows: the optical member is left at about 35° C. and about 45% RH for about 1 day and then stabilized at about 25° C. for about 12 hours, followed by separating the adhesive layer from the glass substrate at a tensile rate of about 300 mm/min in a load cell of about 30 kgf.

Examples of the optical film may include a polarizer plate, a color filter, a phase retardation film, an oval polarizer film, a reflection film, an antireflection film, a compensation film, a brightness enhancement film, an alignment film, a light diffusing film, a glass anti-scattering film, a surface protective film, a plastic LCD substrate, or the like.

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect.

EXAMPLES

Details of components used in Examples 1 to 5 and Comparative Examples 1 and 2 are described as follows.

(A) Acrylic Resin (a1) (meth)acrylate copolymer including less than about 0.01 wt % of hydroxyl group containing monomer 99 parts by weight of n-butyl acrylate (Nihon Shokubai, Co., Ltd.), 1 part by weight of acrylic acid, 100 parts by weight of acetic acid, and 0.2 parts by weight of azobisisobutyronitrile (AIBN) were put in a container equipped with a thermometer, a reflux condenser, and an agitator, followed by substitution of air of the container with nitrogen gas. Then, the mixture in the container was heated to 65° C. and reacted for 6 hours under nitrogen atmosphere while stirring, and then further heated to 70° C. and reacted for 2 hours. After completion of the reaction, the mixture was diluted with toluene, thereby obtaining a solution of an acrylic copolymer. The prepared acrylic copolymer solution had a solid content of 20 wt % and a viscosity of 55,000 mPa·s. The acrylic copolymer had a weight average molecular weight of 1,600,000 g/mol.

(a2) (Meth)acrylate copolymer including about 0.01 to 5 wt % of hydroxyl group containing monomer A (meth)acrylate copolymer including about 0.01 to 5 wt % of repeating units of a hydroxyl group containing monomer included 92.5 wt % of repeating units of n-butyl acrylate, 2.5 wt % of repeating units of an acrylic acid, 5 wt % of repeating units of hydroxyethyl methacrylate, and had a weight average molecular weight of 1,000,000 g/mol and a solid content of 20%.

(B) Isocyanate Cross-Linking Agent: Trimethylolpropane/Tolylene Diisocyanate Adduct (CORONATE® L, Nippon Polyurethane Industry Co., Ltd.)

(C) Carbodiimide Cross-Linking Agent: V-05S (Nisshinbo Chemical Inc.)

(C') Epoxy Cross-Linking Agent: TETRAD-X (Mitsubishi Gas Chemical Company, Inc.)

(D) Silane Coupling Agent (d1) 3-glycidoxypropylmethoxy silane (KBM-403, Shinetsu Chemical Industries Co., Ltd.)

(d2) Isocyanurate silane coupling agent (X-12-965, Shinetsu Chemical Industries Co., Ltd.)

Examples 1 to 5 and Comparative Examples 1 and 2

The components were mixed according to compositions listed in Table 1, and ethyl acetate was added thereto to a concentration of 15% and uniformly stirred for 20 minutes, thereby preparing a solution. The prepared solution was deposited on a PET release film (MRF38, Thickness: 38 μm, Mitsubishi Polyester Film Inc.) to a dry thickness of 25 μm. Then, the solution deposited on the release film was dried at 120° C. for 3 minutes in a drying oven. The dried adhesive layer was deposited on a wide-view coating layer of a polarizer plate coated with a wide-view liquid crystal layer and left in a thermo-hygrostat room (35° C., 45% RH) for 1 day.

TABLE 1

|   |   | Example |   |   |   |   | Comparative Example |   |
|---|---|---|---|---|---|---|---|---|
|   |   | 1 | 2 | 3 | 4 | 5 | 1 | 2 |
| (A) | (a1) | 90 | 95 | 90 | 90 | 100 | 90 | 90 |
|   | (a2) | 10 | 5 | 10 | 10 | 0 | 10 | 10 |
| (B) |   | 15 | 15 | 15 | 10 | 15 | — | 10 |
| (C) |   | 0.01 | 0.01 | 0.005 | 0.02 | 0.01 | 0.01 | — |
| (C') |   | — | — | — | — | — | 0.1 | — |
| (D) | (d1) | 0.2 | 0.2 | 0.2 | 0.2 | 0.2 | 0.2 | — |
|   | (d2) | 0.1 | 0.1 | 0.1 | 0.1 | 0.1 | 0.1 | — |

Evaluation of Physical Properties (1) Light Leakage Resistance

After the release film was separated from each prepared adhesive sheet, the adhesive sheet was attached to an iodine polarizer plate having a thickness of 185 μm. The polarizer plate was cut into 100 mm×125 mm pieces, which were attached to opposite sides of a soda-lime glass substrate (110 mm×190 mm×0.7 mm) to perpendicularly overlap each other. The polarizer plate-attached glass substrate was left at 70° C. for 500 hours and then placed on a backlight at room temperature in a darkroom, followed by observation with the naked eye to identify whether light leaked from the polarizer plate.

☐: No light transmission non-uniformity, such as light leakage, on each edge

O: Difficult to determine light transmission non-uniformity, such as light leakage, on each edge with the naked eye ☐: Slight light transmission non-uniformity, such as light leakage, on each edge X: Substantial light transmission non-uniformity, such as light leakage, on each edge (2) Creep After the polarizer plate was attached to a glass substrate to have a bonding area of 1.5 cm×1.5 cm and left at 22° C. and 50% RH for 3 days, creep was evaluated. Creep was evaluated by measuring a creeping distance of the adhesive when a load of 10 gf/mm$^2$ was applied to the specimen for 1,000 seconds using a universal test machine (UTM).

(3) Peel Strength

180° peel strength between the adhesive (polarizer plate) and the glass substrate was measured by JIS 2107. Peel strength was measured after the specimen was left for 1 day and 4 days respectively under aging conditions of 35° C. and 45% RH for the adhesive to be cured. After aging, the specimen was stabilized at 25° C. for 12 hours and then cut into 25 mm×100 mm pieces, which were laminated onto the glass substrate. The adhesive layer and the glass substrate of each specimen were coupled to upper and lower jigs in a 30 kgf load cell and peeled at a tensile rate of 300 mm/min, thereby measuring load when peeled using a texture analyzer.

(4) Heat and Moisture Resistance

Each adhesive composition-coated polarizer plate was attached to a 100 mm×175 mm glass substrate, followed by application of a pressure of 4 to 5 kg thereto, thereby preparing a specimen. To evaluate heat and moisture resistance, the specimens were left at 60° C./90% RH for 500 hours and then observed to identify whether foaming or separation occurred. Heat resistance was evaluated after the specimens were left at 80° C. for 500 hours. Both properties were evaluated with the naked eye or through a microscope after leaving the specimens at room temperature for 1 hour or more.

☐: Foaming, peeling, or separation unidentified

◯: No appearance of peeling, separation or bubbles having a size of 100 μm or more ◻: Slight appearance of peeling, separation or bubbles having a size of 100 μm or more X: Appearance of peeling, separation or bubbles having a size of 100 μm or more (5) Storage Modulus (Pa)

Dynamic storage modulus of the adhesive was measured using Physica, Anton Paar. The dynamic storage modulus of the adhesive was measured using a fixture with a parallel plate having a diameter of about 8 mm at a frequency of about 10 Hz from about 0 to 120° C. under the condition that a specimen had a thickness of about 1 mm and an elongation of about 10%, thereby obtaining an elastic modulus at about 30° C.

TABLE 2

|  | Example | | | | | Comparative Example | |
| --- | --- | --- | --- | --- | --- | --- | --- |
|  | 1 | 2 | 3 | 4 | 5 | 1 | 2 |
| Light leakage | ◯ | ◯ | ◯ | ◯ | ◯ | X | ☐ |
| Creep(μm) | 68 | 88 | 95 | 60 | 80 | 350 | 140 |
| Peel strength 1 day after aging (g/25 mm) | 380 | 420 | 560 | 360 | 550 | 1020 | 120 |
| Peel strength 4 days after aging (g/25 mm) | 365 | 415 | 480 | 375 | 540 | 890 | 80 |
| Heat and moisture resistance | ☐ | ◯ | ☐ | ◯ | ◯ | X | X |
| Storage modulus (Pa) | $3 \times 10^6$ | $2 \times 10^6$ | $1 \times 10^6$ | $2 \times 10^6$ | $8 \times 10^5$ | $8 \times 10^4$ | $5 \times 10^5$ |

As shown in Table 2, the adhesive compositions according to Examples 1 to 5 did not allow light leakage and exhibited excellent property balance between peel strength, elastic modulus, creep properties, and reliability.

By way of summation and review, when the polarizer plate is fixed by an adhesive, stress may be concentrated on a TAC layer by contraction or expansion of the polarizer plate under high-temperature and high-humidity conditions, leading to birefringence and light leakage. Such a light leakage phenomenon may occur when a polarizer film (which is optically isotropic when the polarizer film is expanded) becomes anisotropic through contraction under high-temperature and high-humidity conditions.

Contraction of the film may be controlled by increasing molecular weight or crosslinking density of components constituting an adhesive. However, such designs in view of light leakage may cause various defects, resulting in deterioration in durability. Thus, in addition to general heat curing, a UV curing process may used not to improve a modulus (to improve crosslinking density) but to enhance durability.

For example, an adhesive may be mixed with a low molecular weight compound to relieve stress or an acrylic adhesive may be mixed with a low molecular weight compound having a positive photoelastic coefficient under residual stress to reduce a negative birefringence of the acrylic adhesive layer under residual stress.

However, addition of a low molecular weight compound may cause contamination of an adherend or deterioration in durability over time. Further, stress relieving-type light leakage may have characteristics in that a light leakage occurrence spot may have a low brightness value but also a wide area and, thus, light leakage may still exist.

An adhesive used for a polarizer plate should have excellent properties such that separation or foaming is reduced or prevented. In addition, when the polarizer plate having an adhesive layer exhibiting such properties is attached to a panel, a reworking process (i.e., a separation process) may be performed due to foreign substances or process failure. It may be difficult to detach the polarizer plate from an adherend, such as a substrate having high adhesive strength, e.g., a film, or glass, or the adhesive may remain on part of an adherend after separation and elimination of the polarizer plate.

A polarizer plate having a plurality of optical films stacked thereon may be attached to an LCD panel through an adhesive layer.

Due to increasing use of polarizer plates with expansion of the LCD market and productivity enhancement, an adhesive that is rapidly usable after application may be desirable. However, an acrylic adhesive may be subjected to adhesive processing by mixing an acrylic polymer and a curing agent and a long aging time until crosslinking reaction is terminated and adhesive performance is stabilized may be required. Thus, adhesives should have excellent reworkability, durability, low light leakage properties, and a short aging time.

The embodiments provide a stress-reinforced adhesive composition that forms a stereoscopic matrix through reaction control to increase elastic modulus, thus improving light leakage (which occurs differently depending on the size of a polarizer plate), and having short aging time and excellent durability under high-temperature and high-humidity conditions. The embodiments also provide an optical member using the adhesive composition having excellent property balance between creep, peel strength, durability, reworkability, and cutting property.

The embodiments provide an adhesive composition that includes two kinds of cross-linking agents to form a close cross-linked structure within a relatively short time in a heat curing system, thereby having a creeping distance of about 100 μm or less at room temperature and excellent light leakage control ability.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. An adhesive composition, comprising:
   an acrylic resin;
   an isocyanate cross-linking agent; and
   a carbodiimide cross-linking agent, wherein:
   the adhesive composition has a creeping distance of about 100 μm or less when the composition attached to a glass substrate with a bonding area of about 1.5 cm×1.5 cm is left at about 22° C. and about 50% RH for about 3 days and is subjected to a load of about 10 gf/mm² for about 1,000 seconds,
   the adhesive composition has a storage modulus of about $1\times10^5$ to about $1\times10^7$ Pa at about 10 Hz and about 30° C. under conditions in which a sample has a thickness of about 1 mm and an elongation of about 10%, and
   a difference between 180° peel strength (P1) and 180° Peel strength (P4) of the adhesive composition is 100 g/25 mm or less, where 180° peel strength (P1) is a 180° peel strength of a specimen measured by JIS 2107 between the adhesive composition and the glass substrate after the specimen was left for 1 day, and 180° peel strength (P4) is a 180° peel strength of the specimen measured by JIS 2107 between the adhesive composition and the glass substrate after the specimen was left for 4 days wherein the adhesive composition includes:
   100 parts by weight of the acrylic resin;
   about 1 to about 30 parts by weight of the isocyanate cross-linking agent;
   about 0.001 to about 1 part by weight of the carbodiimide cross-linking agent; and wherein a weight ratio of the isocyanate cross-linking agent to the carbodiimide cross-linking agent is about 500:1 to about 3,000:1.

2. The adhesive composition as claimed in claim 1, wherein the acrylic resin includes a (meth)acrylate copolymer, the (meth)acrylate copolymer including about 0.01 to about 5 wt % of repeating units of a hydroxyl group containing monomer.

3. The adhesive composition as claimed in claim 1, wherein the acrylic resin includes:
   a first (meth)acrylate copolymer including less than about 0.01 wt % of repeating units of a hydroxyl group containing monomer, and
   a second (meth)acrylate copolymer including about 0.01 to about 5 wt % of repeating units of a hydroxyl group containing monomer.

4. The adhesive composition as claimed in claim 3, wherein the acrylic resin includes:
   about 85 to about 99 wt % of the first (meth)acrylate copolymer, and
   about 1 to about 15 wt % of the second (meth)acrylate copolymer.

5. The adhesive composition as claimed in claim 3, wherein:
   the first (meth)acrylate copolymer has a weight average molecular weight of about 1,000,000 to about 2,000,000 g/mol, and
   the second (meth)acrylate copolymer has a weight average molecular weight of about 500,000 to about 1,500,000 g/mol.

6. The adhesive composition as claimed in claim 3, wherein:
   the first (meth)acrylate copolymer is polymerized from a monomer mixture including:
   about 85 to about 99.99 wt % of C1 to C20 alkyl (meth)acrylate,
   less than about 0.01 wt % of a hydroxyl group containing monomer, and
   about 0.01 to about 15 wt % of a carboxyl group containing monomer, and
   the second (meth)acrylate copolymer is polymerized from a monomer mixture including:
   about 90 to about 99 wt % of C1 to C20 alkyl (meth)acrylate,
   about 0.01 to about 5 wt % of a hydroxyl group containing monomer, and
   about 0.1 to about 5 wt % of a carboxyl group containing monomer.

7. The adhesive composition as claimed in claim 1, wherein the acrylic resin has a weight average molecular weight of about 1,500,000 to about 3,000,000 g/mol.

8. The adhesive composition as claimed in claim 1 further comprising about 0.01 to 20 parts by weight of a silane coupling agent.

9. The adhesive composition as claimed in claim 1, wherein the adhesive composition includes:
   100 parts by weight of the acrylic resin;
   greater than about 10 parts by weight to less than about 30 parts by weight of the isocyanate cross-linking agent; and
   about 0.005 to about 0.1 parts by weight of the carbodiimide cross-linking agent.

10. An optical member, comprising:
    an optical film; and
    an adhesive layer prepared from the adhesive composition as claimed in claim 1, the adhesive layer being on one or more sides of the optical film.

11. The optical member as claimed in claim 10, wherein the optical member has a 180° peel strength of about 250 to 600 gf/25mm between an adhesive and a glass substrate at a tensile rate of about 300 mm/min by JIS 2107 when the optical member is left at about 35° C. and about 45% RH for about 1 day and then stabilized at about 25° C. for about 12 hours.

12. An adhesive composition, comprising:
    100 parts by weight of an acrylic resin, the acrylic resin including a (meth)acrylate copolymer including about 0.01 to about 5 wt % of repeating units of a hydroxyl group containing monomer;
    about 1 to about 30 parts by weight of an isocyanate cross-linking agent; and
    a carbodiimide cross-linking agent in an amount such that a weight ratio of the isocyanate cross-linking agent to the carbodiimide cross-linking agent is about 500:1 to about 3,000:1,
    wherein a difference between 180° peel strength (P1) and 180° peel strength (P4) is 100 g/25mm or less (where, 180° peel strength (P1) is a 180° peel strength of a specimen measured by JIS 2107 between the adhesive composition and the glass substrate after the specimen was left for 1 day, 180° peel strength (P4) is a 180° peel strength of the specimen measured by JIS 2107 between the adhesive composition and the glass substrate after the specimen was left for 4 days).

* * * * *